US011042740B2

(12) United States Patent
Tajika

(10) Patent No.: US 11,042,740 B2
(45) Date of Patent: Jun. 22, 2021

(54) IMAGE PROCESSING DEVICE, FLIGHT VEHICLE, AND COMPUTER-READABLE STORAGE MEDIUM

(71) Applicant: SoftBank Corp., Tokyo (JP)

(72) Inventor: Akihiko Tajika, Saitama (JP)

(73) Assignee: SoftBank Corp., Tokyo (JP)

( * ) Notice: Subject to any disclaimer, the term of this patent is extended or adjusted under 35 U.S.C. 154(b) by 0 days.

(21) Appl. No.: 16/989,832

(22) Filed: Aug. 10, 2020

(65) Prior Publication Data

US 2020/0372238 A1   Nov. 26, 2020

Related U.S. Application Data

(63) Continuation of application No. PCT/JP2019/003219, filed on Jan. 30, 2019.

(30) Foreign Application Priority Data

Feb. 20, 2018   (JP) .............................. JP2018-027905

(51) Int. Cl.
*G06T 7/73* (2017.01)
*G06K 9/00* (2006.01)
(Continued)

(52) U.S. Cl.
CPC .......... *G06K 9/0063* (2013.01); *B64C 39/024* (2013.01); *G05D 1/0094* (2013.01); *G05D 1/042* (2013.01); *G06T 7/74* (2017.01); *H04B 7/18508* (2013.01); *B64C 2201/127* (2013.01); *B64C 2201/146* (2013.01); *G06K 2209/23* (2013.01); *G06T 2207/10032* (2013.01)

(58) Field of Classification Search
CPC .......... G06T 7/74; G06T 7/174; G06T 7/593; G06K 2209/23; B64C 39/024
See application file for complete search history.

(56) References Cited

U.S. PATENT DOCUMENTS

2008/0298638 A1   12/2008   Miyazaki
2018/0262674 A1   9/2018   Iwakura
2019/0086939 A1   3/2019   Li

FOREIGN PATENT DOCUMENTS

CN   102779347 A   11/2012
CN   205524962 U   8/2016
(Continued)

OTHER PUBLICATIONS (ISA/237) Written Opinion of the International Search Authority for International Patent Application No. PCT/JP2019/003219, mailed by the Japan Patent Office dated Apr. 16, 2019.
(Continued)

*Primary Examiner* — Sam Bhattacharya

(57) ABSTRACT

There is provided an image processing device including: an image acquisition unit for acquiring a first image including, as a subject, a first region captured by a first camera which captures an image from a first altitude toward a direction of an altitude lower than the first altitude, and a second image including, as a subject, the first region captured by a second camera which captures an image from a second altitude toward a direction of an altitude lower than the second altitude; and a flying object detection unit for detecting a flying object at an altitude lower than the first altitude and the second altitude, based on a difference between the first region in the first image and the first region in the second image.

18 Claims, 13 Drawing Sheets

(51) Int. Cl.
  *B64C 39/02* (2006.01)
  *G05D 1/00* (2006.01)
  *G05D 1/04* (2006.01)
  *H04B 7/185* (2006.01)

(56) References Cited

FOREIGN PATENT DOCUMENTS

| | | |
|---|---|---|
| CN | 106444837 A | 2/2017 |
| CN | 106598075 A | 4/2017 |
| CN | 107016690 A | 8/2017 |
| CN | 107439004 A | 12/2017 |
| JP | H0969148 A | 3/1997 |
| JP | H11257931 A | 9/1999 |
| JP | 2000283753 A | 10/2000 |
| JP | 2001333416 A | 11/2001 |
| JP | 2008298631 A | 12/2008 |
| JP | 2017167870 A | 9/2017 |
| KR | 101252680 B1 | 4/2013 |
| WO | 2017073310 A1 | 5/2017 |

OTHER PUBLICATIONS

Decision to Grant a Patent issued for counterpart Japanese Application No. 2018-027905, drafted by the Japan Patent Office dated Jan. 21, 2020.
Office Action issued for counterpart Korean Application 10-2020-7026536, issued by the Korean Intellectual Property Office dated Jan. 21, 2021.
Notice of First Office Action for Patent Application No. 201980013537.2, issued by The National Intellectual Property Administration of the Peoples Republic of China dated Mar. 1, 2021.

IMAGE PROCESSING DEVICE, FLIGHT VEHICLE, AND COMPUTER-READABLE STORAGE MEDIUM

The contents of the following patent applications are incorporated herein by reference:
NO. 2018-027905 filed in JP on Feb. 20, 2018, and
NO. PCT/JP2019/003219 filed in WO on Jan. 30, 2019.

BACKGROUND

1. Technical Field

The present invention relates to an image processing device, a flight vehicle, and a computer-readable storage medium.

2. Related Art

A flying object monitoring system that detects a flying object flying into a monitoring region has been known (for example, refer to Patent Literature 1).

PRIOR ART LITERATURE

Patent Literature

[Patent Literature 1] Japanese Unexamined Patent Application Publication No. 2017-167870

Technical Problem

It is desirable to provide a technique capable of appropriately detecting an unrecognizable flying object.

DESCRIPTION OF EXEMPLARY EMBODIMENTS

Hereinafter, the present invention will be described through embodiments of the invention, but the following embodiments do not limit the invention according to the claims. In addition, not all the combinations of features described in the embodiments are essential for means to solve the problem in the invention.

Figure 1:
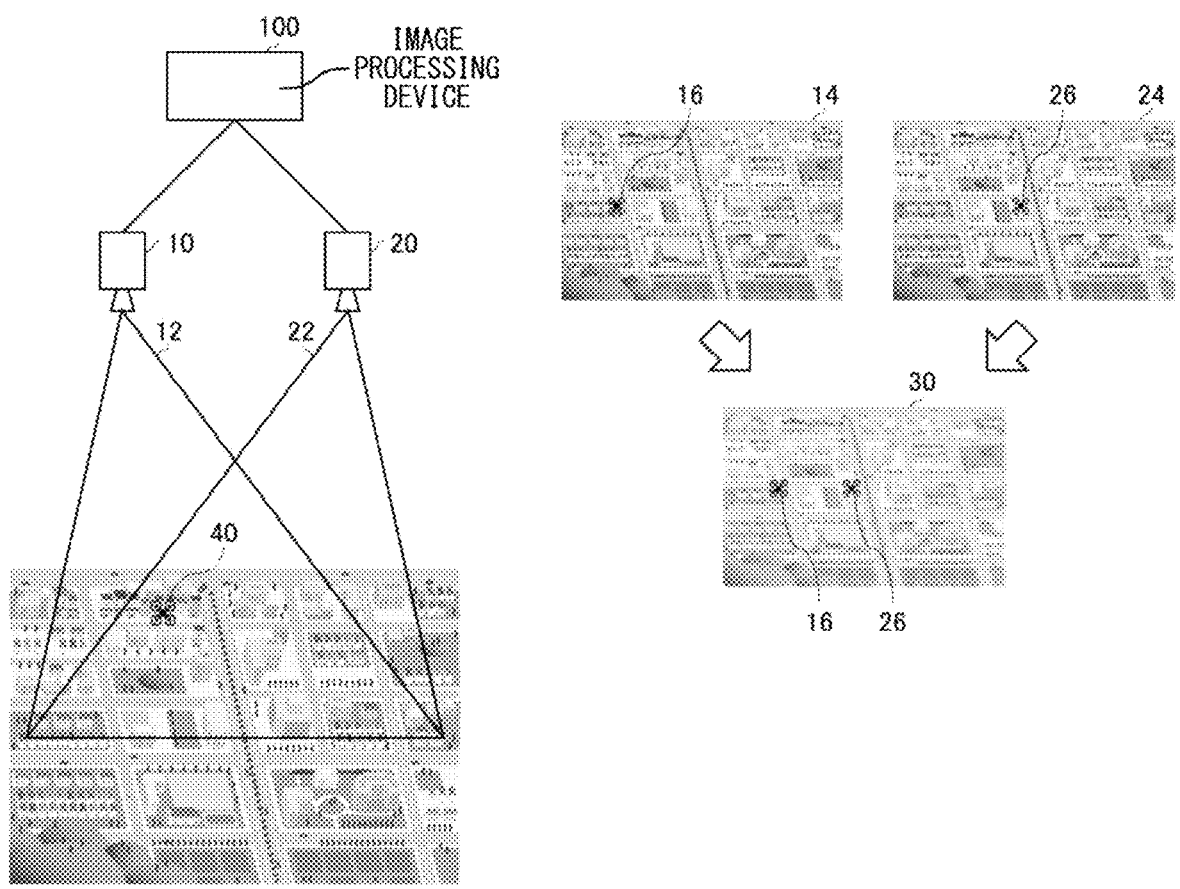
FIG. 1 is an illustration describing image processing by an image processing device 100.

FIG. 1 is an illustration describing image processing by an image processing device 100. The image processing device 100 acquires, from a camera 10, an image 14 captured by the camera 10 which captures an image from a first altitude toward a direction of an altitude lower than the first altitude. The image processing device 100 may receive the image 14 from the camera 10 via a wired connection. The image processing device 100 may also receive the image 14 from the camera 10 via a wireless connection. The image processing device 100 may also receive the image 14 from the camera 10 via any network. The first altitude may be an altitude of the camera 10. The camera 10 is, for example, a camera that is mounted on a flight vehicle to capture the ground surface. The camera 10 may be a camera that is arranged on an upper floor of a high-rise building, for example, the top floor, to capture the ground surface. The camera 10 may be a visible light camera. The camera 10 may be an infrared camera. The camera 10 may be a multispectral camera. The camera 10 may be a so-called radar.

Further, the image processing device 100 acquires, from a camera 20, an image 24 captured by the camera 20 which captures an image from a second altitude toward a direction of an altitude lower than the second altitude. The image processing device 100 may receive the image 24 from the camera 20 via a wired connection. The image processing device 100 may also receive the image 24 from the camera 20 via a wireless connection. The image processing device 100 may receive the image 24 from the camera 20 via any network. The second altitude may be an altitude of the camera 20. The camera 20 is, for example, a camera that is mounted on a flight vehicle to capture the ground surface, and the camera 20 may also be a camera that is arranged on an upper floor of a high-rise building, for example, the top floor, to capture the ground surface. The camera 20 may be a visible light camera. The camera 20 may be an infrared camera. The camera 20 may be a multispectral camera. The camera 20 may be a so-called radar.

The image processing device 100 detects a flying object at an altitude lower than the first altitude and the second altitude by using the image 14 including a first region as a subject, and the image 24 including the first region as a subject. When an image-capturing range 12 of the image 14 and an image-capturing range 22 of the image 24 are the same, the first region may be a whole image of the image 14 and the image 24. When the image-capturing range 12 of the image 14 and the image-capturing range 22 of the image 24 deviate from each other, the first region may be a region commonly included in the image 14 and the image 24.

The camera 10 and the camera 20 are distant from each other in a horizontal direction, and a subject at a higher altitude among subjects included in the image 14 and the image 24 is located more differently in the image 14 and the image 24. In FIG. 1, an altitude of a flying object 40 is higher than those of other subjects, and a location of a flying object 16 in the image 14 and a location of a flying object 26 in the image 24 deviate from each other.

The image processing device 100 detects the flying object based on a difference between the first region in the image 14 and the first region in the image 24. For example, as exemplified in FIG. 1, the image processing device 100 generates a difference image 30 between the image 14 and the image 24, and when it is possible to determine that the flying object 16 and the flying object 26, which are extracted as the difference, are the same object, the image processing device 100 detects the flying object 16 and the flying object 26 as one flying object. Captured time of the image 14 and the image 24 may be the same.

The image processing device 100 may detect the flying object based on the difference between the first region in the image 14 and the first region in the image 24, and information on topographies and buildings within a range corresponding to the first region in map data including the information on the topographies and the buildings. Among the subjects of the image 14 and the image 24, in addition to the flying object 16 and the flying object 26, a high-rise building, a mountain, and the like which have relatively high altitudes are detected as the difference; however, among target objects detected as the difference, the image processing device 100 may exclude the high-rise building, the mountain, and the like which are included in the map data. This makes it possible to improve a detection accuracy of the flying object 16 and the flying object 26.

The image processing device 100 may identify the flying object based on at least any of the image captured by the camera 10 and the image captured by the camera 20. The image processing device 100 may identify the flying object based on at least any of a shape of the flying object and a movement of the flying object. For example, the image processing device 100 identifies whether the flying object is an unmanned aerial vehicle such as a drone. The image processing device 100 also identifies, for example, whether the flying object is a bird. When the flying object is the bird, and the camera 10 and the camera 20 are the infrared camera and a hyperspectral camera, the image processing device 100 may identify a species of the bird, based on at least any of the image 14 and the image 24.

The image processing device 100 may derive at least any of a flight speed, a flight direction, and a flight route prediction of the flying object, based on at least any of the image captured by the camera 10 and the image captured by the camera 20. For example, the image processing device 100 derives the flight speed and the flight direction of the flying object from temporally continuous images. The image processing device 100 also derives, for example, the flight route prediction from the derived flight speed and the flight direction.

Figure 2:
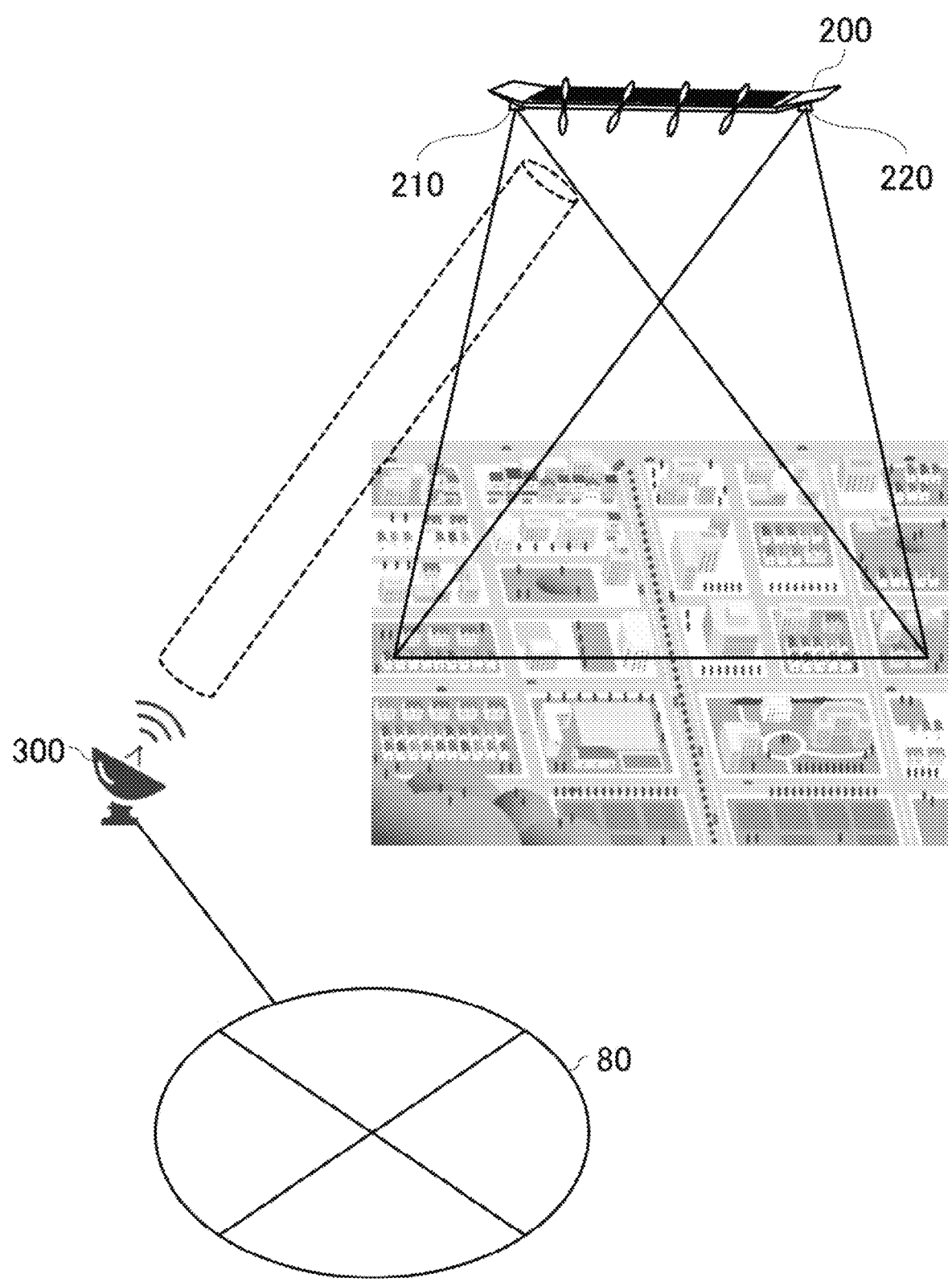
FIG. 2 schematically shows an example of a flight vehicle 200.

FIG. 2 schematically shows an example of a flight vehicle 200. The flight vehicle 200 may function as the image processing device 100. The flight vehicle 200 has a camera 210 and a camera 220. The camera 210 is arranged at one end of a wing of the flight vehicle 200, and the camera 220 is arranged at the other end of the wing of the flight vehicle 200. The camera 210 and the camera 220 may be examples of the camera 10 and the camera 20. The flight vehicle 200 shown in FIG. 2 is a stratospheric platform having a propeller, a solar panel, a battery, and an antenna. In FIG. 2, a case where the flight vehicle 200 is the stratospheric platform will be described as an example; however, the flight vehicle 200 is not limited thereto and may be an airplane, an unmanned aerial vehicle, a hot air balloon, and the like. When the flight vehicle 200 has a long shape in the longitudinal direction, the camera 210 may be arranged at a front end of the flight vehicle 200 and the camera 220 may be arranged at a rear end of the flight vehicle 200.

The flight vehicle 200 communicates with a network 80 via a ground station 300. The network 80 includes, for example, the Internet and a mobile phone network.

The flight vehicle 200 detects the flying object from images captured by the camera 210 and the camera 220. When the flight vehicle 200 detects the flying object, the flight vehicle 200 may transmit a warning to any communication equipment via the ground station 300 and the network 80. The flight vehicle 200 may further transmit, to the communication equipment, the image of the flying object, and the flight speed, the flight direction, the flight route prediction, and the like of the flying object.

Figure 3:
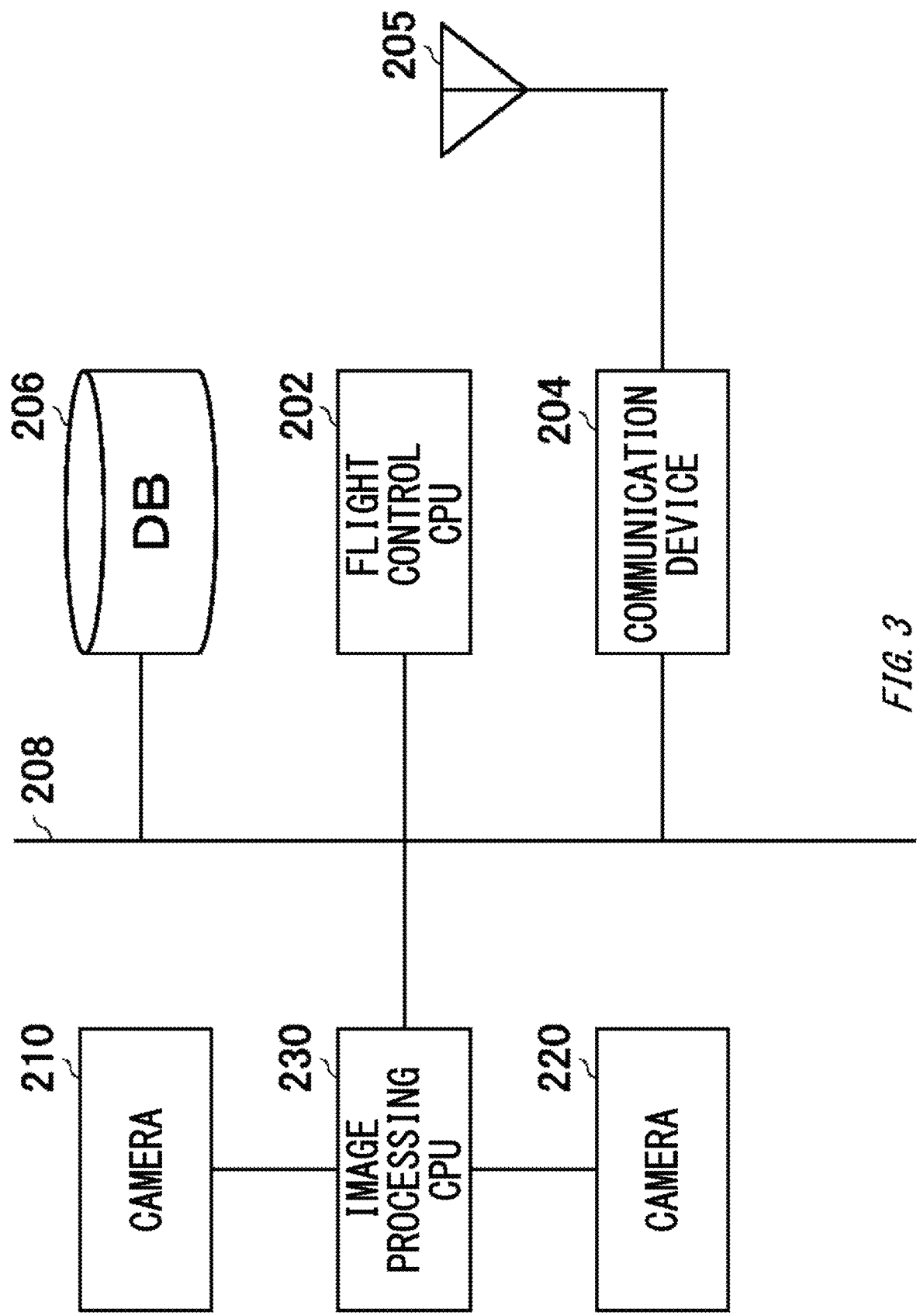
FIG. 3 schematically shows an example of a hardware configuration of the flight vehicle 200.

FIG. 3 schematically shows an example of a hardware configuration of the flight vehicle 200. The flight vehicle 200 includes a flight control CPU (Central Processing Unit) 202, a communication device 204, an antenna 205, a DB (Data-Base) 206, the camera 210, the camera 220, and an image processing CPU 230. The flight control CPU 202, the communication device 204, the DB 206, and the image processing CPU 230 are connected via a data bus 208.

The flight control CPU 202 controls flight of the flight vehicle 200. The communication device 204 executes communication via the antenna 205. The communication device 204 communicates, for example, with the ground station 300 via the antenna 205.

The DB 206 stores various types of data. The DB 206 stores, for example, map data including the information on topographies and buildings. The DB 206 stores, for example, map data received by the communication device 204 from any communication equipment via the ground station 300 and the network 80. The DB 206 may store the image captured by the camera 210. The DB 206 may store the image captured by the camera 220.

The image processing CPU 230 processes the image captured by the camera 210 and the image captured by the camera 220. The image processing CPU 230 detects the flying object at a lower altitude than that of the flight vehicle 200, based on the difference between the first region in the image captured by the camera 210 and the first region in the image captured by the camera 220.

Figure 4:
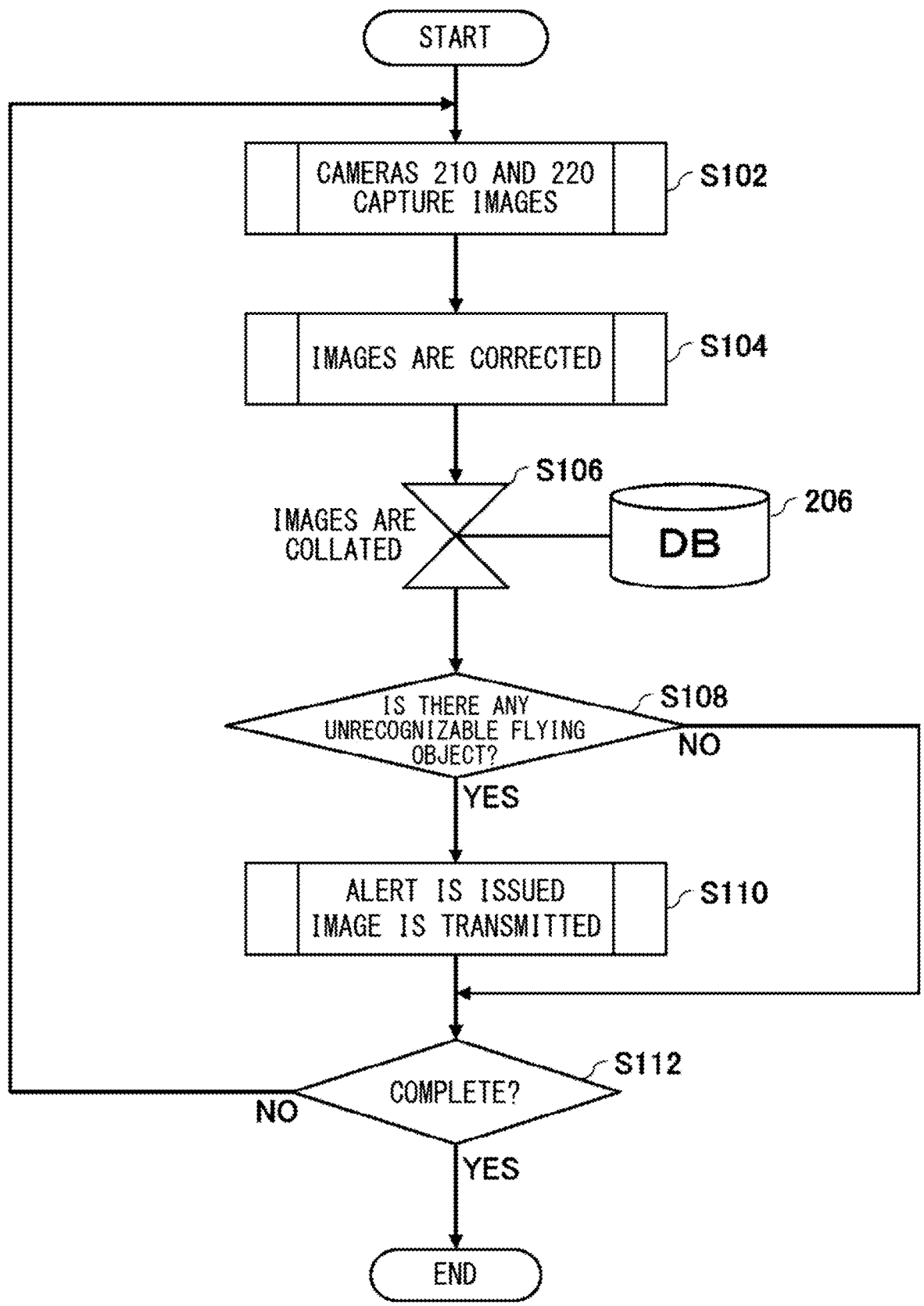
FIG. 4 schematically shows an example of a processing flow executed by the flight vehicle 200.

FIG. 4 schematically shows an example of a processing flow executed by the flight vehicle 200. The flight vehicle 200 regularly executes, for example, the processing shown in FIG. 4. The flight vehicle 200 may execute the processing shown in FIG. 4 in response to receiving an instruction from the ground station 300.

In step (the step may be abbreviated as S) 102, the camera 210 and the camera 220 capture the images. In S104, the image processing CPU 230 corrects the images captured by the camera 210 and the camera 220. For example, the image processing CPU 230 performs tilt correction on the image.

In S106, the image processing CPU 230 collates the images corrected in S104. The image processing CPU 230 may refer to the map data stored in the DB 206 and exclude the known buildings, mountains, and the like, from the collated images.

In S108, the image processing CPU 230 determines whether there is an unrecognizable flying object in the image. If yes, the processing proceeds to S110, otherwise, the processing proceeds to S112. In S110, the image processing CPU 230 causes the communication device 204 to issue an alert to preset equipment via the ground station 300 and the network 80, and to transmit an image of the unrecognizable flying object.

In S112, a determination is made over whether to complete the processing. If no, the processing returns to S102, and if yes, the processing is completed.

Figure 5:
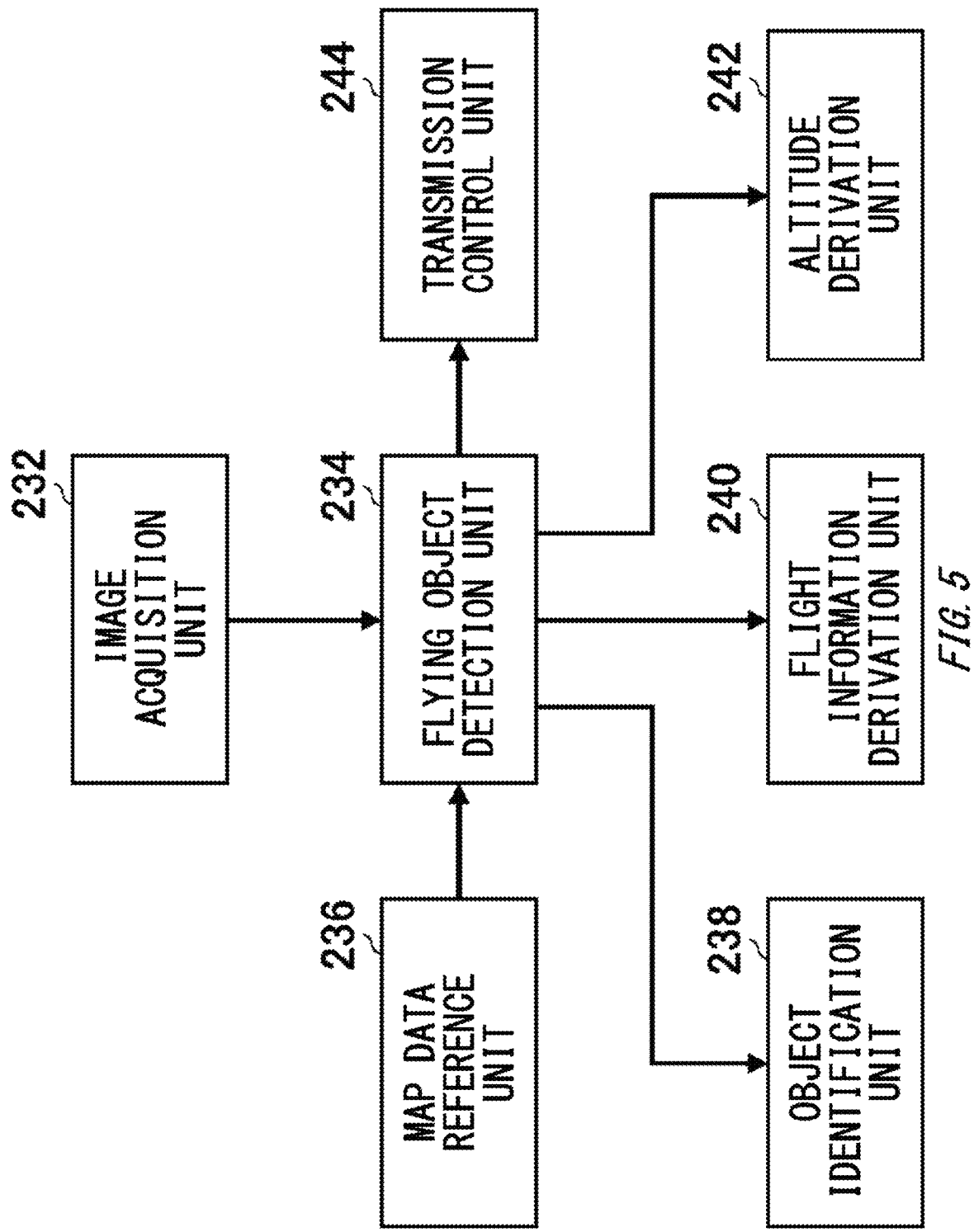
FIG. 5 schematically shows an example of a functional configuration of the flight vehicle 200.

FIG. 5 schematically shows an example of a functional configuration of the image processing CPU 230. The image processing CPU 230 has an image acquisition unit 232, a flying object detection unit 234, a map data reference unit 236, an object identification unit 238, a flight information derivation unit 240, an altitude derivation unit 242, and a transmission control unit 244.

The image acquisition unit 232 acquires the image captured by the camera 210. The image acquisition unit 232 acquires the image captured by the camera 220.

The flying object detection unit 234 detects the flying object based on the image acquired by the image acquisition unit 232. The map data reference unit 236 refers to the map data stored in the DB 206. The flying object detection unit 234 may detect the flying object based on the image acquired by the image acquisition unit 232 and the map data referenced by the map data reference unit 236.

The object identification unit 238 identifies the flying object detected by the flying object detection unit 234, based on the images which are captured by the camera 210 and the camera 220 and which are acquired by the image acquisition unit 232. The object identification unit 238 determines, for example, whether the flying object is an unmanned aerial vehicle. The object identification unit 238 may identify whether the flying object is a bird.

The flight information derivation unit 240 derives at least any of the flight speed, the flight direction, and the flight route prediction of the flying object detected by the flying object detection unit 234, based on the images which are captured by the camera 210 and the camera 220 and which are acquired by the image acquisition unit 232.

The altitude derivation unit 242 derives the altitude of the flying object detected by the flying object detection unit 234. For example, the altitude derivation unit 242 derives the altitude of the flying object based on a distance from the camera 210 to the flying object, and the altitude of the camera 210. For example, the altitude derivation unit 242 sets an altitude measured by an altimeter which the flight vehicle 200 includes to be the altitude of the camera 210. Further, for example, the altitude derivation unit 242 applies a well-known method such as a method using triangulation to the image captured by the camera 210 and the image captured by the camera 220 so as to derive the distance between the camera 210 and the flying object. Then, the altitude derivation unit 242 derives the altitude of the flying object by subtracting the distance between the camera 210 and the flying object from the altitude of the camera 210.

The transmission control unit 244 causes the communication device 204 to transmit various pieces of information. For example, when the flying object detection unit 234 detects the flying object, the transmission control unit 244 causes the communication device 204 to transmit warning information toward preset communication equipment. The transmission control unit 244 may be an example of a warning output unit. The transmission control unit 244 may cause the communication device 204 to transmit the identification result obtained by the object identification unit 238. The transmission control unit 244 may cause the communication device 204 to transmit the information derived by the flight information derivation unit 240. The transmission control unit 244 may cause the communication device 204 to transmit the altitude derived by the altitude derivation unit 242.

Note that FIG. 2 to FIG. 5 have described the examples in which the flight vehicle 200 functions as the image processing device 100; however, the present invention is not limited thereto. For example, the ground station 300 may function as the image processing device 100. In this case, the ground station 300 receives the images captured by the camera 210 and the camera 220 from the flight vehicle 200, and detects the flying object based on the received images. The communication equipment connected to the network 80 may also, for example, function as the image processing device 100. In this case, the communication equipment receives the images captured by the camera 210 and the camera 220 via the flight vehicle 200, the ground station 300, and the network 80, and detects the flying object based on the received images.

Figure 6:
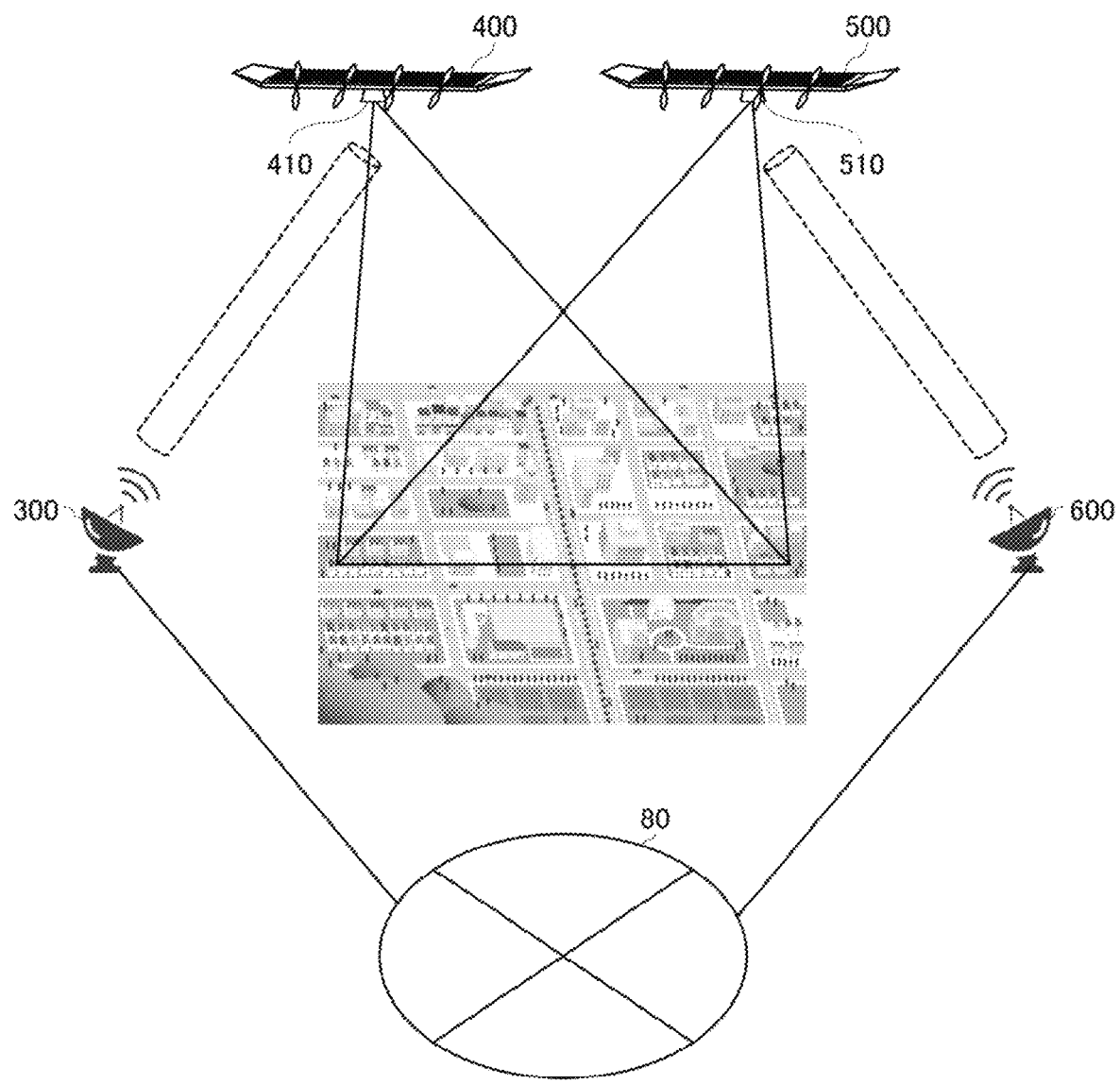
FIG. 6 schematically shows examples of a flight vehicle 400 and a flight vehicle 500.

FIG. 6 schematically shows examples of a flight vehicle 400 and a flight vehicle 500. The flight vehicle 400 has a camera 410. The camera 410 may be an example of the camera 10. The flight vehicle 500 has a camera 510. The camera 510 may be an example of the camera 20. The flight vehicle 400 and flight vehicle 500 shown in FIG. 6 are stratospheric platforms. In FIG. 6, a case where the flight vehicle 400 and the flight vehicle 500 are the stratospheric platforms will be described as an example; however, the flight vehicle 400 and the flight vehicle 500 are not limited thereto and may be airplanes, unmanned aerial vehicles, hot air balloons, and the like.

The flight vehicle 400 communicates with the network 80 via the ground station 300. The flight vehicle 500 communicates with the network 80 via a ground station 600. The ground station 300 may function as the image processing device.

The ground station 300 receives an image captured by the camera 410 from the flight vehicle 400. Further, the ground station 300 receives an image captured by the camera 510 via the flight vehicle 500, the ground station 600, and the network 80. The ground station 300 detects the flying object from the image captured by the camera 410 and the image captured by the camera 510. When the ground station 300 detects the flying object, the ground station 300 may transmit a warning to any communication equipment via the network 80. The ground station 300 may further transmit, to the communication equipment, the image of the flying object, and the flight speed, the flight direction, the flight route prediction, and the like of the flying object.

Figure 7:
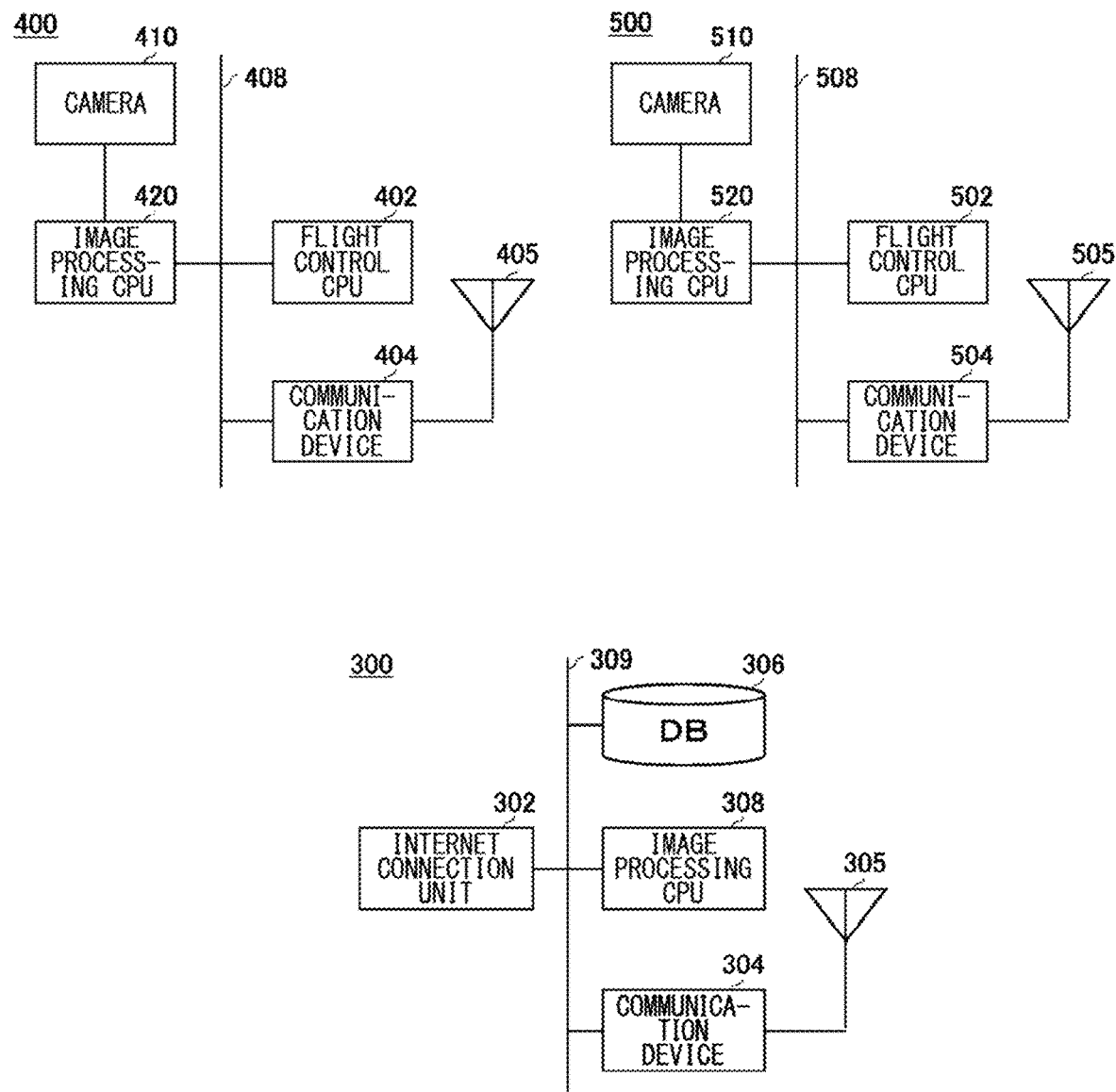
FIG. 7 schematically shows examples of hardware configurations of the flight vehicle 400, the flight vehicle 500, and a ground station 300.

FIG. 7 schematically shows examples of hardware configurations of the flight vehicle 400, the flight vehicle 500, and a ground station 300. The flight vehicle 400 includes a flight control CPU 402, a communication device 404, an antenna 405, the camera 410, and an image processing CPU 420. The flight control CPU 402, the communication device 404, and the image processing CPU 420 are connected via a data bus 408.

The flight control CPU 402 controls a flight of the flight vehicle 400. The communication device 404 executes communication via the antenna 405. The communication device 404 communicates, for example, with the ground station 300 via the antenna 405.

The image processing CPU 420 processes the image captured by the camera 410. For example, the image processing CPU 420 causes the communication device 404 to transmit the image captured by the camera 410 toward the ground station 300. The image processing CPU 420 may perform tilt correction on the image captured by the camera 410.

The flight vehicle 500 includes a flight control CPU 502, a communication device 504, an antenna 505, the camera 510, and an image processing CPU 520. The flight control CPU 502, the communication device 504, and the image processing CPU 520 are connected via a data bus 508.

The flight control CPU 502 controls a flight of the flight vehicle 500. The communication device 504 executes communication via the antenna 505. The communication device 504 communicates, for example, with the ground station 600 via the antenna 505.

The image processing CPU 520 processes the image captured by the camera 510. For example, the image processing CPU 520 causes the communication device 504 to transmit the image captured by the camera 510 toward the ground station 600. The image processing CPU 520 may perform tilt correction on the image captured by the camera 510.

The ground station 300 includes an internet connection unit 302, a communication device 304, an antenna 305, a DB 306, and an image processing CPU 308. The internet connection unit 302, the communication device 304, the DB 306, and the image processing CPU 308 are connected via a data bus 309.

The internet connection unit 302 is connected to the network 80 to communicate with the communication equipment on the Internet. The communication device 304 executes communication via the antenna 305. The communication device 304 communicates, for example, with the flight vehicle 400 via the antenna 305.

The DB 306 stores various types of data. The DB 306 stores, for example, map data including the information on the topographies and the buildings. The DB 306 stores, for example, map data received by the internet connection unit 302 from any communication equipment via the network 80. The DB 306 may store the image which is captured by the camera 410 and which is received by the communication device 304 from the flight vehicle 400. The DB 306 may store the image which is captured by the camera 510 and which is received by the internet connection unit 302 from the flight vehicle 500 via the network 80 and the ground station 600.

The image processing CPU 308 processes the image captured by the camera 410 and the image captured by the camera 510. The image processing CPU 308 detects the flying object at a lower altitude than those of the flight vehicle 400 and the flight vehicle 500, based on the difference between the first region in the image captured by the camera 410 and the first region in the image captured by the camera 510.

Figure 8:
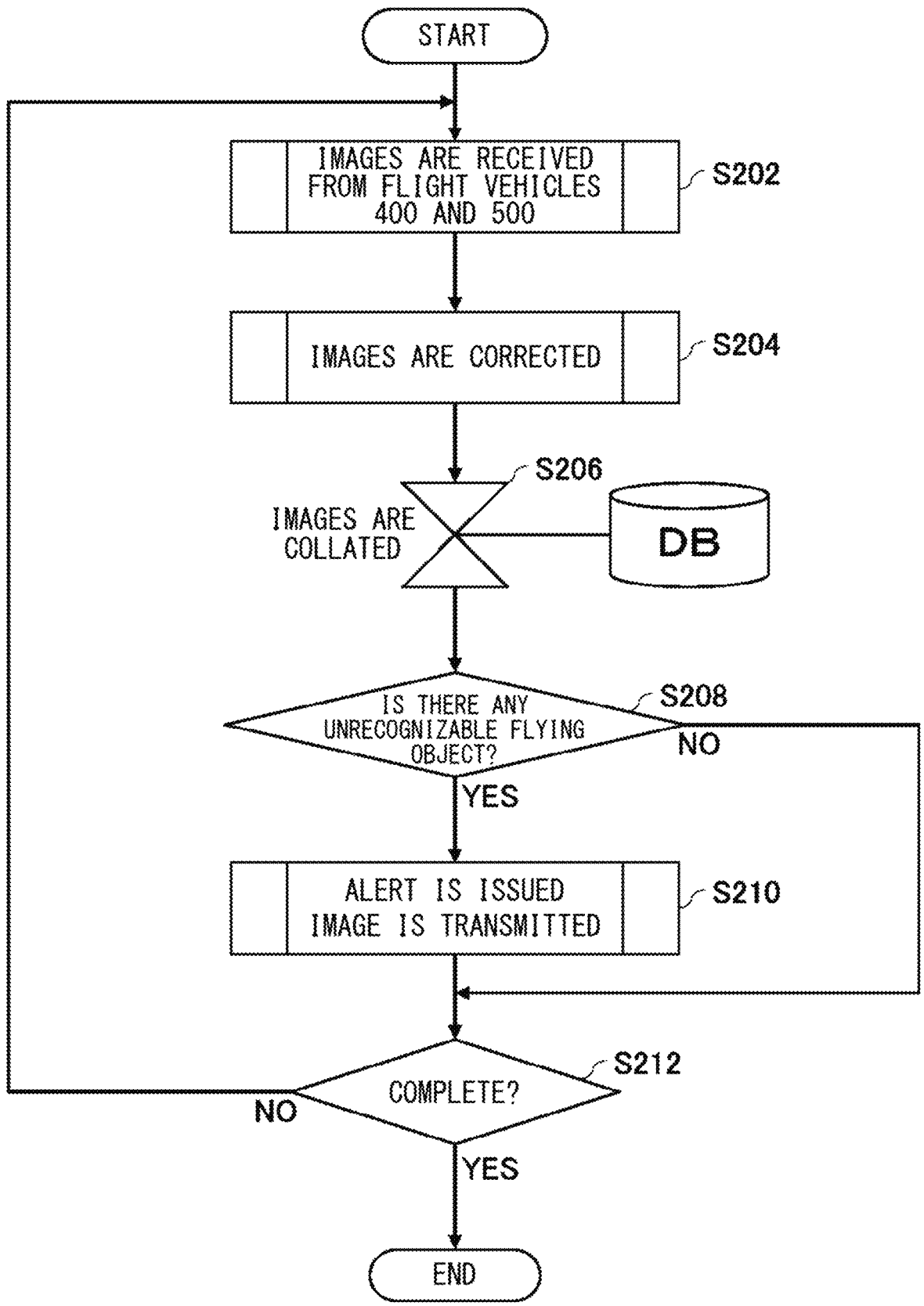
FIG. 8 schematically shows an example of a processing flow executed by the ground station 300.

FIG. 8 schematically shows an example of a processing flow executed by the ground station 300. The ground station 300 regularly executes, for example, the processing shown in FIG. 8.

In S202, the images captured by the flight vehicle 400 and the flight vehicle 500 are received. In S204, the image processing CPU 308 corrects the images received in S202. For example, the image processing CPU 308 performs tilt correction on the image.

In S206, the image processing CPU 308 collates the images corrected in S204. The image processing CPU 308 may refer to the map data stored in the DB 306 and exclude the known buildings, mountains, and the like from the collated images.

In S208, the image processing CPU 308 determines whether there is an unrecognizable flying object in the image. If yes, the processing proceeds to S210, and otherwise, the processing proceeds to S212. In S210, the image processing CPU 308 causes the communication device 304 to issue an alert to the preset communication equipment via the network 80 and to transmit an image of the unrecognizable flying object.

In S212, a determination is made over whether to complete the processing. If no, the processing returns to S202, and if yes, the processing is completed.

Figure 9:
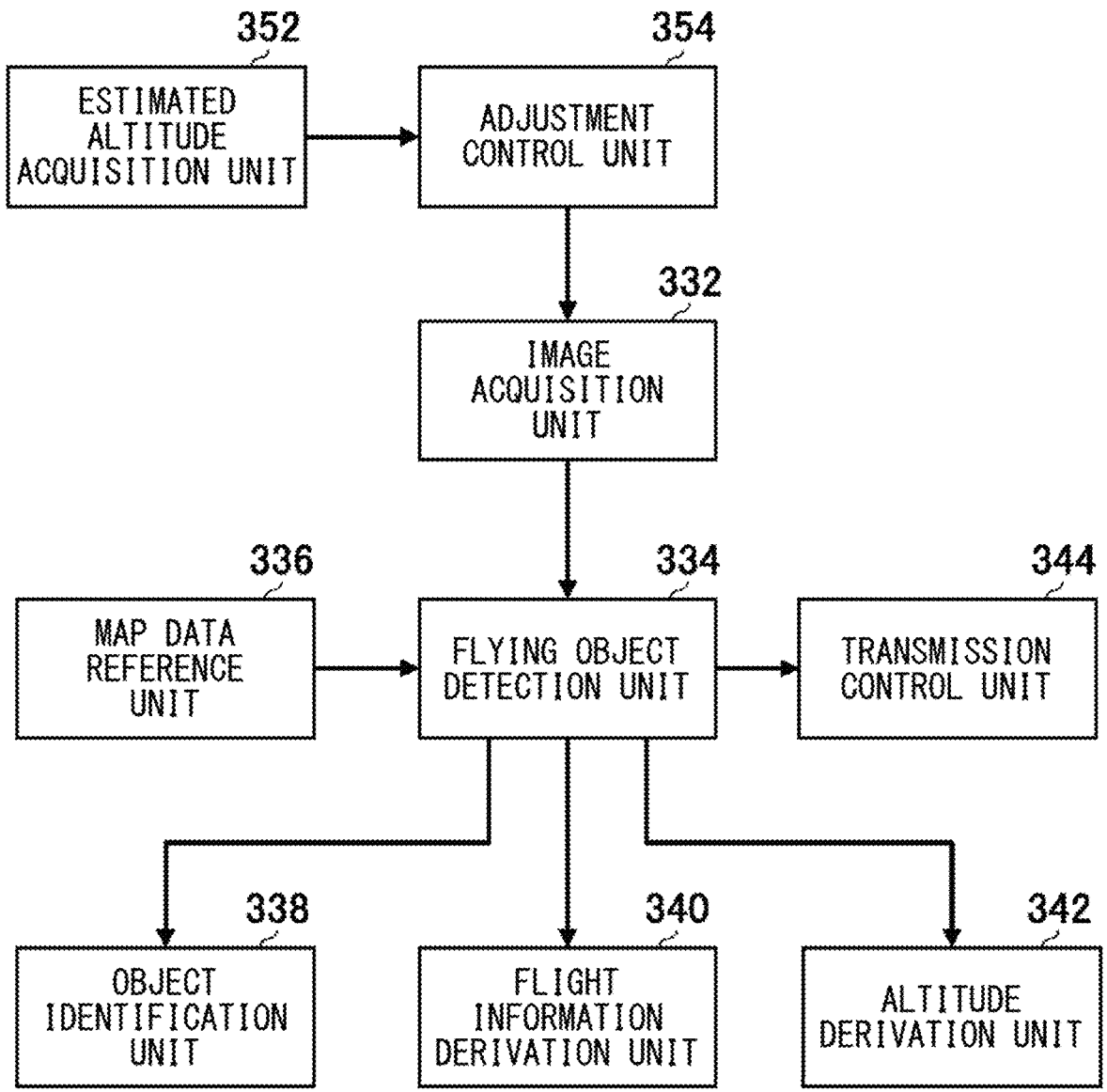
FIG. 9 schematically shows an example of a functional configuration of the ground station 300.

FIG. 9 schematically shows an example of a functional configuration of the image processing CPU 308. The image processing CPU 308 has an image acquisition unit 332, a flying object detection unit 334, a map data reference unit 336, an object identification unit 338, a flight information derivation unit 340, an altitude derivation unit 342, a transmission control unit 344, an estimated altitude acquisition unit 352, and an adjustment control unit 354.

The image acquisition unit 332 acquires the image captured by the camera 410. The image acquisition unit 332 acquires the image captured by the camera 510.

The flying object detection unit 334 detects the flying object based on the image acquired by the image acquisition unit 332. The map data reference unit 336 refers to the map data stored in the DB 306. The flying object detection unit 334 may detect the flying object based on the image acquired by the image acquisition unit 332 and the map data referenced by the map data reference unit 336.

The object identification unit 338 identifies the flying object detected by the flying object detection unit 334, based on the images which are captured by the camera 410 and the camera 510 and which are acquired by the image acquisition unit 332. The object identification unit 338 determines, for example, whether the flying object is an unmanned aerial vehicle. The object identification unit 338 may identify whether the flying object is a bird.

The flight information derivation unit 340 derives at least any of the flight speed, the flight direction, and the flight route prediction of the flying object detected by the flying object detection unit 334, based on the images which are captured by the camera 210 and the camera 220 and which are acquired by the image acquisition unit 332.

The altitude derivation unit 342 derives the altitude of the flying object detected by the flying object detection unit 334. For example, the altitude derivation unit 342 derives the altitude of the flying object based on a distance from the camera 410 to the flying object, and the altitude of the camera 410. For example, the altitude derivation unit 342 sets an altitude measured by an altimeter which the flight vehicle 400 includes to be the altitude of the camera 410. Further, for example, the altitude derivation unit 342 applies a well-known method such as a method using triangulation to the image captured by the camera 410 and the image captured by the camera 510 so as to derive the distance between the camera 410 and the flying object. Then, the altitude derivation unit 342 derives the altitude of the flying object by subtracting the distance between the camera 410 and the flying object from the altitude of the camera 410.

The transmission control unit 344 causes the communication device 304 to transmit various pieces of information. For example, when the flying object detection unit 334 detects the flying object, the transmission control unit 344 causes the communication device 304 to transmit warning information toward the preset communication equipment. The transmission control unit 344 may cause the communication device 304 to transmit the identification result obtained by the object identification unit 338. The transmission control unit 344 may cause the communication device 304 to transmit the information derived by the flight information derivation unit 340. The transmission control unit 344 may cause the communication device 304 to transmit the altitude derived by the altitude derivation unit 342.

Note that FIG. 6 to FIG. 9 have described the examples in which the ground station 300 functions as the image processing device 100; however, the present invention is not limited thereto. For example, the ground station 600 may function as the image processing device 100. In this case, the ground station 600 receives the image captured by the camera 410 from the flight vehicle 400 via the ground station 300 and the network 80, receives the image captured by the camera 510 from the flight vehicle 500, and detects the flying object based on the received images. The communication equipment connected to the network 80 may also, for example, function as the image processing device 100. In this case, the communication equipment receives the image captured by the camera 410 via the ground station 300 and the network 80, receives the image captured by the camera 510 via the ground station 600 and the network 80, and detects the flying object based on the received images.

The estimated altitude acquisition unit 352 acquires an estimated altitude of the flying object. For example, the estimated altitude acquisition unit 352 acquires the estimated altitude of the flying object from the communication equipment on the network 80. For example, the estimated altitude is an average altitude of the flying object which is a detection target.

The adjustment control unit 354 adjusts a distance between the flight vehicle 400 and the flight vehicle 500 depending on the estimated altitude acquired by the estimated altitude acquisition unit 352. For example, in order to adjust the distance between the flight vehicle 400 and the flight vehicle 500, the adjustment control unit 354 causes the communication device 304 to transmit flight control data of the flight vehicle 400 toward the flight vehicle 400. and causes the internet connection unit 302 to transmit the flight control data of the flight vehicle 500 toward the flight vehicle 500.

The estimated altitude acquisition unit 352 may further acquire an estimated location of the flying object, and in this case, the adjustment control unit 354 may cause the distance between the flight vehicle 400 and the flight vehicle 500, the altitude of the flight vehicle 400, and the altitude of the flight vehicle 500 to be adjusted depending on the estimated altitude and the estimated location.

Figure 10:
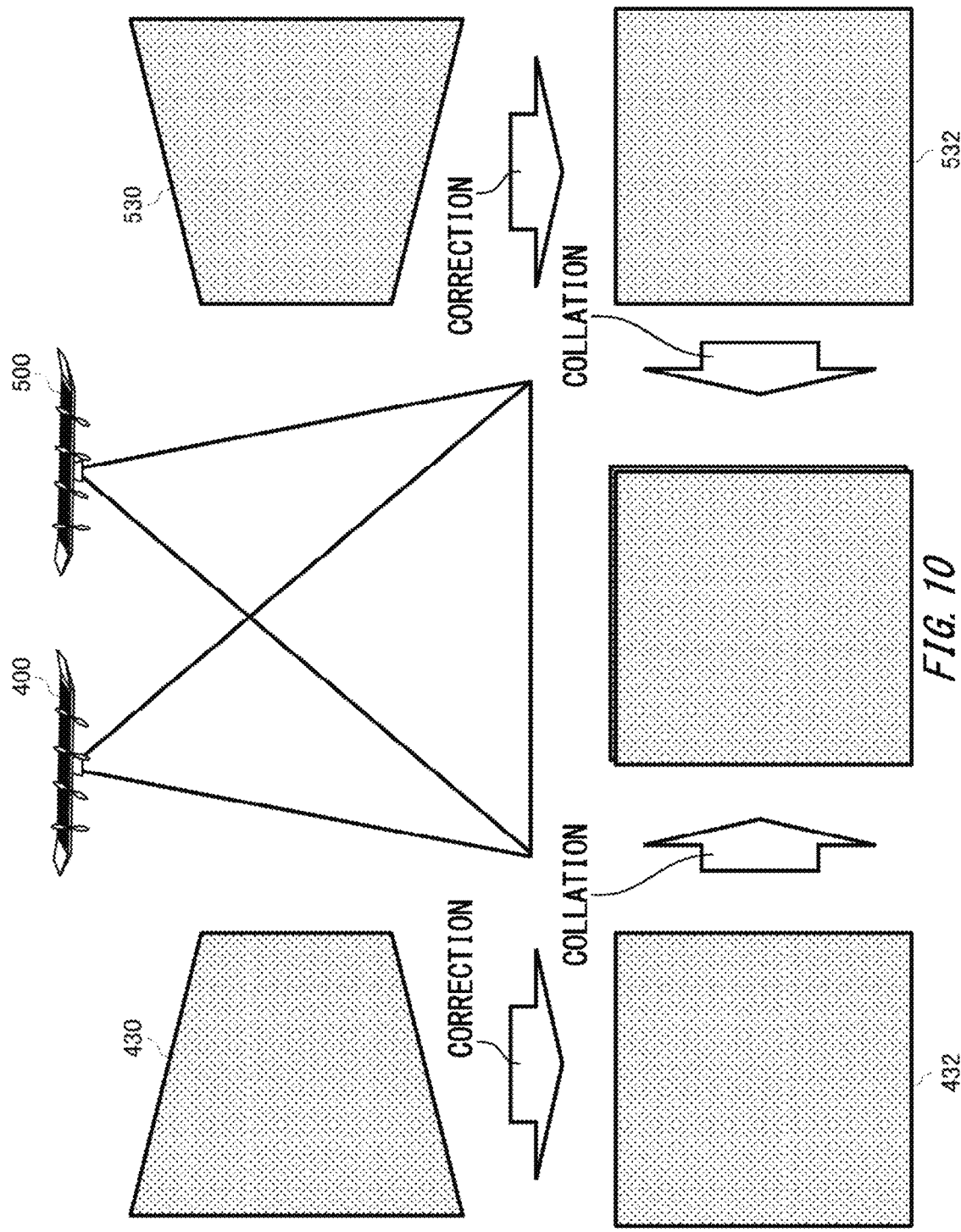
FIG. 10 is an illustration describing tilt correction for an image 430 and an image 530 obtained by the flight vehicle 400 and the flight vehicle 500.

FIG. 10 is an illustration describing tilt correction for an image 430 and an image 530 obtained by the flight vehicle 400 and the flight vehicle 500. The tilt correction for the image 430 may be executed by the flight vehicle 400. When the ground station 300 functions as the image processing device, the tilt correction for the image 430 may also be executed by the ground station 300. When the communication equipment on the network 80 functions as the image processing device, the tilt correction for the image 430 may also be executed by the communication equipment.

The tilt correction for the image 530 may be executed by the flight vehicle 500. When the ground station 600 functions as the image processing device, the tilt correction for the image 530 may also be executed by the ground station 600. When the communication equipment on the network 80 functions as the image processing device, the tilt correction for the image 530 may also be executed by the communication equipment.

A corrected image 432 obtained by the tilt correction for the image 430 and a corrected image 532 obtained by the tilt correction for the image 530 may be collated by the image processing device 100.

Figure 11:
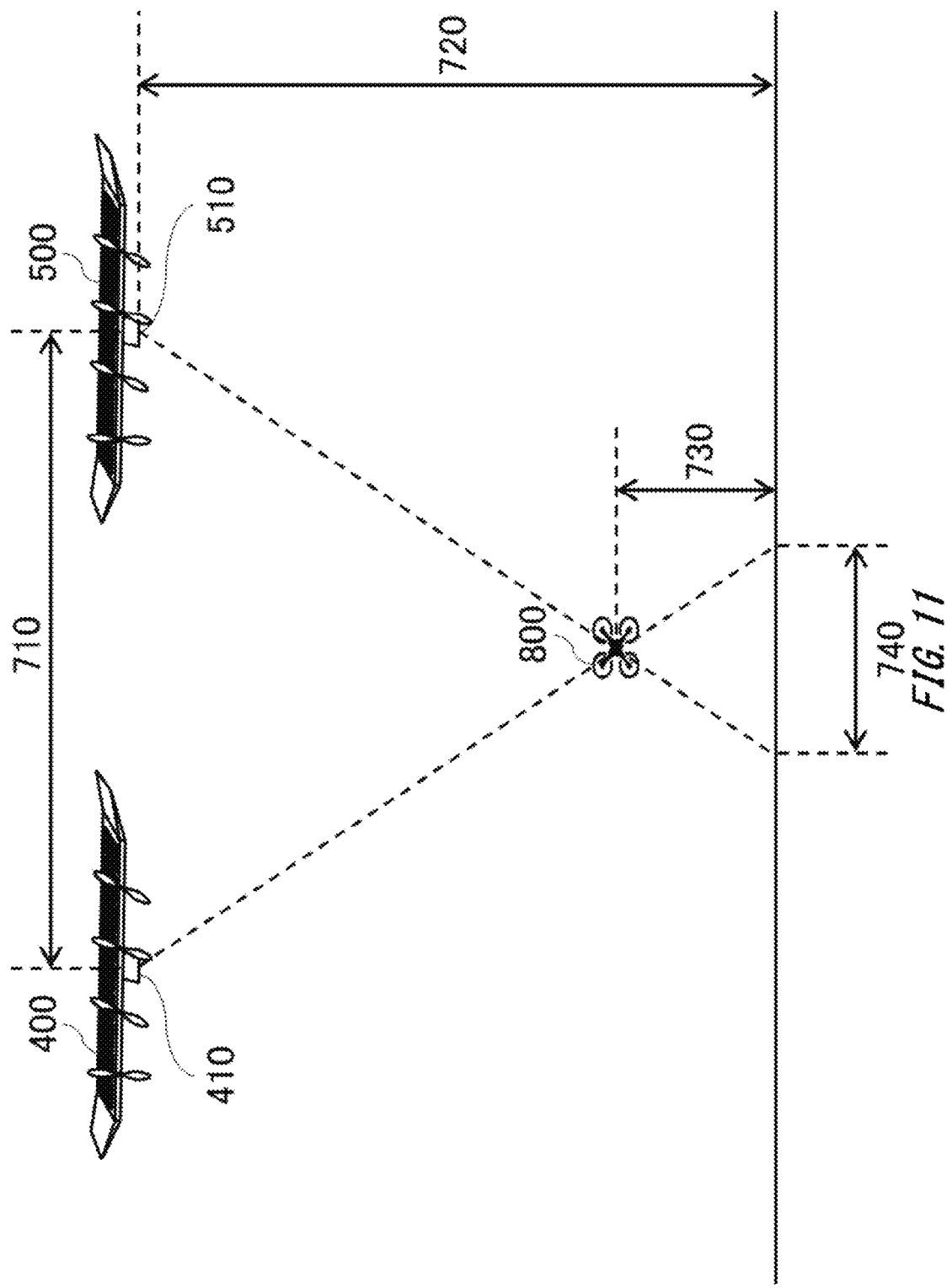
FIG. 11 is an illustration describing a detection accuracy of a flying object 800.

FIG. 11 is an illustration describing a detection accuracy of a flying object 800. Here, a case where the total number of pixels of images captured by the camera 410 and the camera 510 is 100,000,000 pixels, the number of vertical pixels is 10,000 pixels, the number of horizontal pixels is 10,000 pixels, image-capturing ranges of the camera 410 and the camera 510 are 1-km square, a distance 710 between the camera 410 and the camera 510 is 2 km, the altitude of the camera 410 and the camera 510 is 20 km, and a height of an unmanned aerial vehicle, which is the flying object 800 as a target, above ground level is 10 m will be described as an example.

In this case, a size of one pixel is 0.1 m. Since a top and a bottom of an unmanned aerial vehicle have similar shapes, altitude 730/altitude 720=distance 740/distance 710, the distance 740 is 1 m, and the number of deviation pixels is 10 pixels.

As shown in FIG. 11, for example, when the flight vehicle 400 and the flight vehicle 500 flying at an altitude of 20 km are captured from a location 2 km away, it is theoretically possible to detect an unmanned aerial vehicle at a height of 10 m above ground level.

In the above described embodiment, the example in which the flight vehicle 200 communicates with the network 80 via the ground station 300 has been mainly described; however, the present invention is not limited thereto. The flight vehicle 200 may execute satellite communication.

Figure 12:
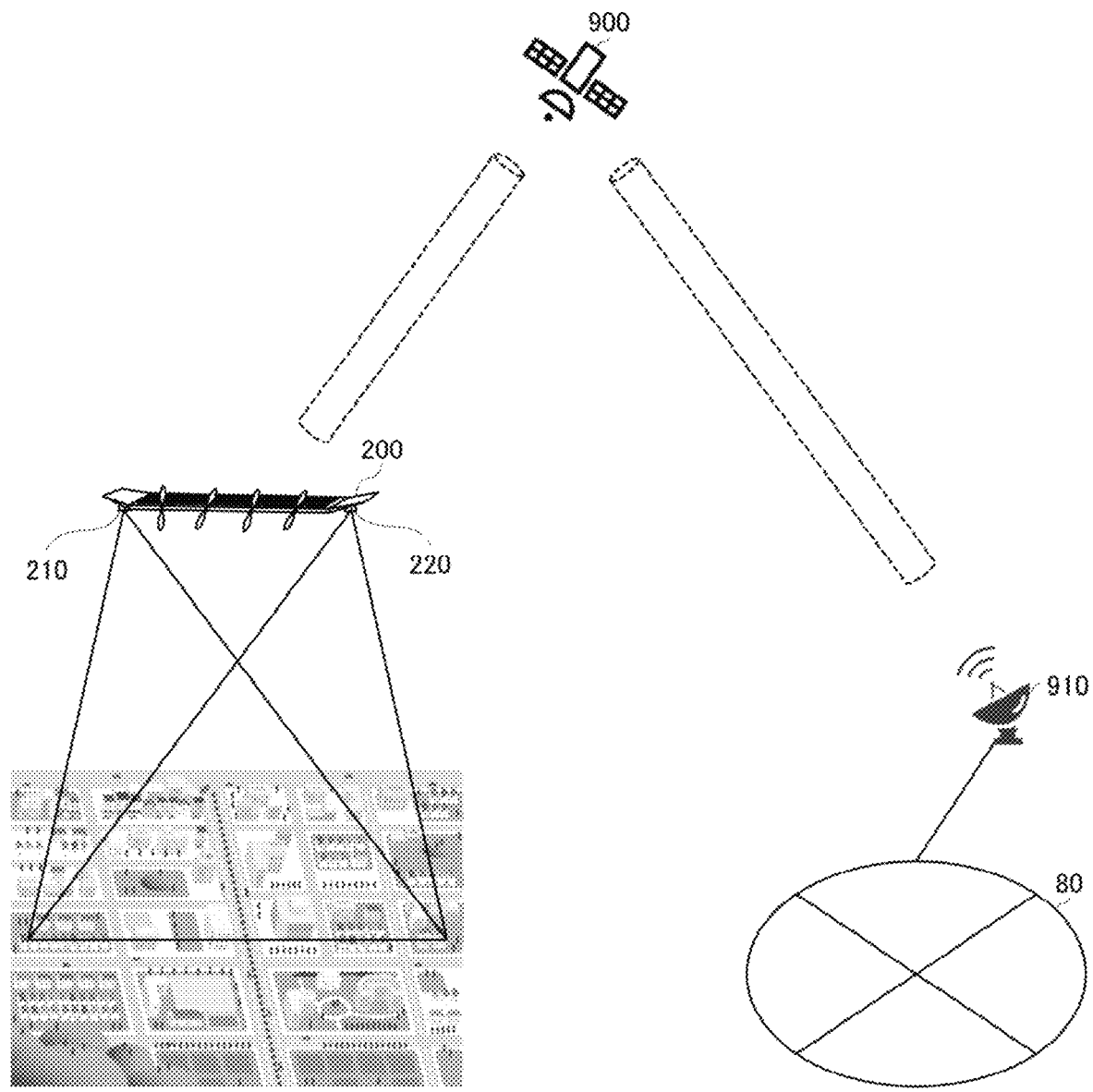
FIG. 12 schematically shows an example of a communication environment of the flight vehicle 200.

FIG. 12 schematically shows an example of a communication environment of the flight vehicle 200. Here, differences from FIG. 2 will be mainly described.

The flight vehicle 200 includes a satellite communication unit (not shown) and executes satellite communication with a communication satellite 900. The flight vehicle 200 may communicate with the network 80 via the communication satellite 900. For example, the communication satellite 900 relays communication between the flight vehicle 200 and the network 80 via a ground station 910.

When the flight vehicle 200 detects the flying object, the flight vehicle 200 may transmit a warning to any communication equipment via the communication satellite 900, the ground station 910, and the network 80. The flight vehicle 200 may further transmit, to the communication equipment, the image of the flying object, and the flight speed, the flight direction, the flight route prediction, and the like of the flying object.

Figure 13:
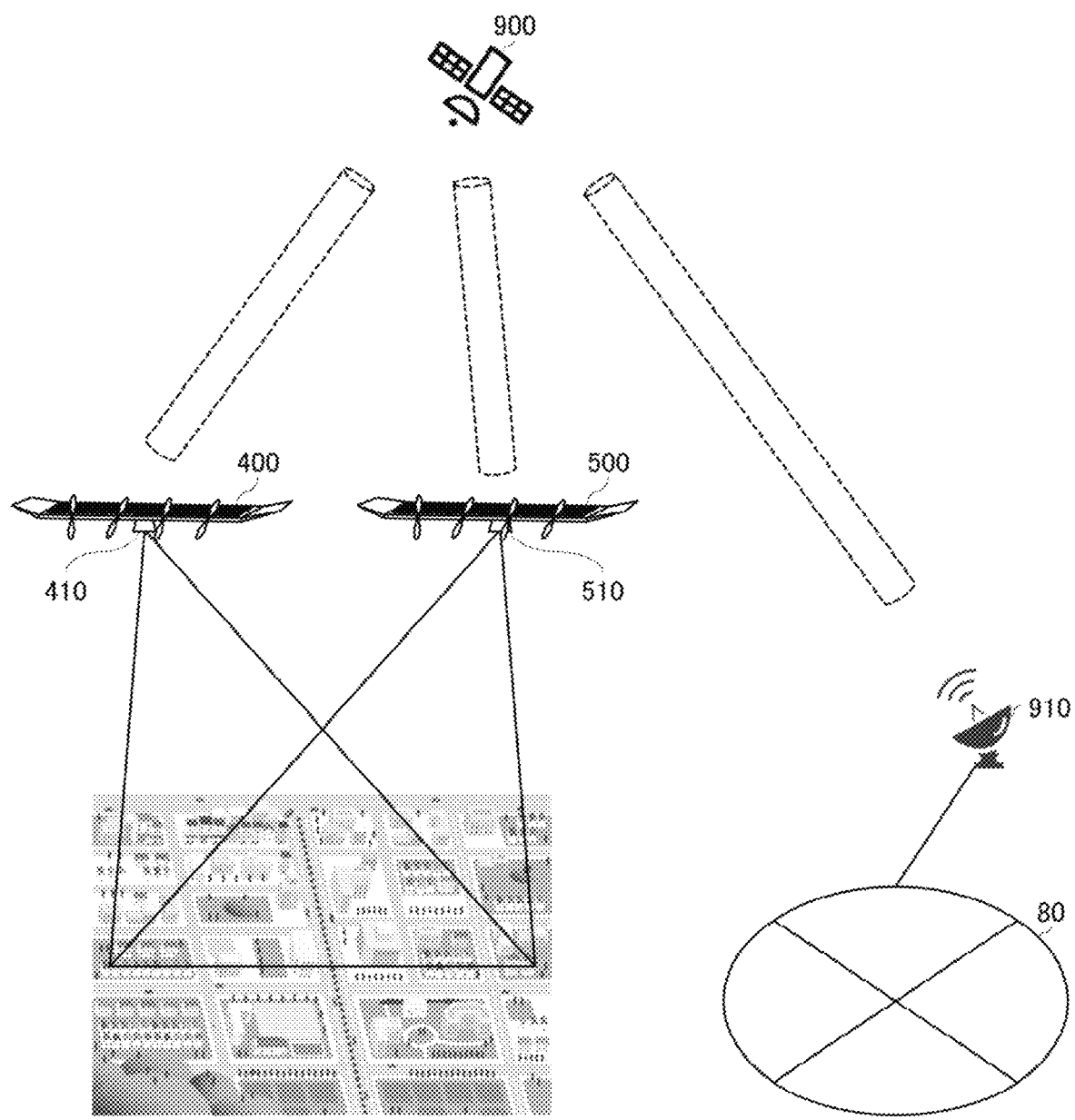
FIG. 13 schematically shows an example of communication environments of the flight vehicle 400 and the flight vehicle 500.

FIG. 13 schematically shows an example of communication environments of the flight vehicle 400 and the flight vehicle 500. Here, differences from FIG. 6 will be mainly described.

The flight vehicle 400 includes a satellite communication unit (not shown) and executes satellite communication with the communication satellite 900. The flight vehicle 400 may communicate with the network 80 via the communication satellite 900. For example, the communication satellite 900 relays communication between the flight vehicle 400 and the network 80 via the ground station 910.

The flight vehicle 500 includes a satellite communication unit (not shown) and executes satellite communication with the communication satellite 900. The flight vehicle 500 may communicate with network 80 via the communication satellite 900. For example, the communication satellite 900 relays communication between the flight vehicle 500 and the network 80 via the ground station 910.

The ground station 910 may include a satellite communication unit (not shown), and may receive the image captured by the camera 410 via the flight vehicle 400 and the communication satellite 900. The ground station 910 may also receive the image captured by the camera 510 via the flight vehicle 500 and the communication satellite 900. The ground station 910 may detect the flying object from the image captured by the camera 410 and the image captured by the camera 510. When the ground station 910 detects the flying object, the ground station 910 may transmit a warning to any communication equipment via the network 80. The ground station 910 may further transmit, to the communication equipment, the image of the flying object, and the flight speed, the flight direction, the flight route prediction, and the like of the flying object.

The flight vehicle 400 may communicate with the flight vehicle 500 via the communication satellite 900. For example, the flight vehicle 400 may also receive the image captured by the camera 510 via the flight vehicle 500 and the communication satellite 900. The flight vehicle 400 may detect the flying object from the image captured by the camera 410 and the image captured by the camera 510. When the flight vehicle 400 detects the flying object, the flight vehicle 400 may transmit a warning to any communication equipment via the communication satellite 900, the ground station 910, and the network 80. The flight vehicle 400 may further transmit, to the communication equipment, the image of the flying object, and the flight speed, the flight direction, the flight route prediction, and the like of the flying object.

In the above description, each unit of the image processing device 100 may be realized by hardware or may be realized by software. Each unit of the image processing device 100 may also be realized by a combination of hardware and software. Further, a computer may function as the image processing device 100 by executing a program. The program may be installed on a computer that constitutes at least a part of the image processing device 100 from a computer-readable medium or a storage device connected to a network.

A program, which is installed on a computer and causes the computer to function as the image processing device 100 according to the present embodiment, works on a CPU or the like to cause the computer to function as each unit of the image processing device 100. Information processing described in these programs functions as specific means by which software and hardware resources of the image processing device 100 cooperate by being read by the computer.

While the embodiments of the present invention have been described, the technical scope of the invention is not limited to the above described embodiments. It is apparent to persons skilled in the art that various alterations and improvements can be added to the above described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: camera, 12: image-capturing range, 14: image, 16: flying object, 20: camera, 22: image-capturing range, 24: image, 26: flying object, 30: difference image, 40: flying object, 80: network, 100: image processing device, 200: flight vehicle, 202: flight control CPU, 204: communication device, 205: antenna, 206: DB, 208: data bus, 210: camera, 220: camera, 230: image processing CPU, 232: image acquisition unit, 234: flying object detection unit, 236: map data reference unit, 238: object identification unit, 240: flight information derivation unit, 242: altitude derivation unit, 244: transmission control unit, 300: ground stations, 302: internet connection unit, 304: communication device, 305: antenna, 306: DB, 308: image processing CPU, 309: data bus, 332: image acquisition unit, 334: flying object detection unit, 336: map data reference unit, 338: object identification unit, 340: flight information derivation unit, 342: altitude derivation unit, 344: transmission control unit, 352: estimated altitude acquisition unit, 354: adjustment control unit, 400: flight vehicle, 402: flight control CPU, 404: communication device, 405: antenna, 408: data bus, 410: camera, 420: image processing CPU, 430: image, 432: corrected image, 500: flight vehicle, 502: flight control CPU, 504: communication device, 505: antenna, 508: data bus, 510: camera, 520: image processing CPU, 530: image, 532: corrected image, 600: ground station, 710: distance, 720: altitude, 730: altitude, 740: distance, 800: flying object, 900: communication satellite, 910: ground station

What is claimed is:

1. An image processing device comprising:
   an image acquisition unit for acquiring:
   a first image including, as a subject, a first region captured by a first camera which is mounted on a first flight vehicle and which captures an image from a first altitude toward a direction of an altitude lower than the first altitude, and
   a second image including, as a subject, the first region captured by a second camera which is mounted on a second flight vehicle different from the first flight vehicle and which captures an image from a second altitude toward a direction of an altitude lower than the second altitude;
   a flying object detection unit for detecting a flying object at an altitude lower than the first altitude and the second altitude, based on a difference between the first region in the first image and the first region in the second image;
   an estimated altitude acquisition unit for acquiring an estimated altitude of the flying object; and
   an adjustment control unit for causing a distance between the first flight vehicle and the second flight vehicle to be adjusted depending on the estimated altitude.

2. The image processing device according to claim 1, wherein, in order to adjust the distance between the first flight vehicle and the second flight vehicle, the adjustment control unit causes flight control data of the first flight vehicle to be transmitted toward the first flight vehicle, and causes flight control data of the second flight vehicle to be transmitted toward the second flight vehicle.

3. The image processing device according to claim 1, wherein the estimated altitude acquisition unit further acquires an estimated location of the flying object, and the adjustment control unit causes the distance between the first flight vehicle and the second flight vehicle, an altitude of the first flight vehicle, and an altitude of the second flight vehicle to be adjusted depending on the estimated altitude and the estimated location.

4. An image processing device comprising:
   an image acquisition unit for acquiring:
   a first image including, as a subject, a first region captured by a first camera which captures an image from a first altitude toward a direction of an altitude lower than the first altitude, and a second image including, as a subject, the first region captured by a second camera which captures an image from a second altitude toward a direction of an altitude lower than the second altitude;

a map data reference unit for referring to map data including information on topographies and buildings;

a flying object detection unit for detecting the flying object at a lower altitude than the first altitude and the second altitude, based on a difference between the first region in the first image and the first region in the second image, and information on topographies and buildings within a range corresponding to the first region in the map data.

5. The image processing device according to claim 1, wherein a shooting time of the first image may be the same as a shooting time of the second image.

6. The image processing device according to claim 1, wherein the image acquisition unit acquires the first image which has been captured by the first camera and then subjected to tilt correction, and the second image which has been captured by the second camera and then subjected to tilt correction.

7. The image processing device according to claim 1, further comprising:

an object identification unit for identifying the flying object, based on at least any of the image captured by the first camera and the image captured by the second camera.

8. The image processing device according to claim 7, wherein the object identification unit identifies whether the flying object is a bird.

9. The image processing device according to claim 7, wherein the object identification unit identifies whether the flying object is an unmanned aerial vehicle.

10. The image processing device according to claim 1, further comprising:

a flight information derivation unit for deriving at least any of a flight speed, a flight direction, and a flight route prediction of the flying object, based on at least any of the image captured by the first camera and the image captured by the second camera.

11. The image processing device according to claim 1, further comprising:

an altitude derivation unit for deriving an altitude of the flying object, based on a distance from the first camera to the flying object and the first altitude.

12. The image processing device according to claim 1, further comprising:

a warning output unit for outputting a warning in response to the detection of the flying object by the flying object detection unit.

13. The image processing device according to claim 12, the image processing device being mounted on a flight vehicle, wherein the warning output unit transmits the warning to ground communication equipment, via a communication satellite, in response to the detection of the flying object by the flying object detection unit.

14. The image processing device according to claim 1, the image processing device being mounted on a flight vehicle, and the image processing device further comprising a satellite communication unit for communicating with a communication satellite.

15. A non-transitory computer readable storage medium comprising a program stored thereon, the program causing a computer to function as:

an image acquisition unit for acquiring:

a first image including, as a subject, a first region captured by a first camera which is mounted on a first flight vehicle and which captures an image from a first altitude toward a direction of an altitude lower than the first altitude, and a second image including, as a subject, the first region captured by a second camera which is mounted on a second flight vehicle different from the first flight vehicle and which captures an image from a second altitude toward a direction of an altitude lower than the second altitude;

a flying object detection unit for detecting a flying object at an altitude lower than the first altitude and the second altitude, based on a difference between the first region in the first image and the first region in the second image;

an estimated altitude acquisition unit for acquiring an estimated altitude of the flying object; and an adjustment control unit for causing a distance between the first flight vehicle and the second flight vehicle to be adjusted depending on the estimated altitude.

16. A non-transitory computer readable storage medium comprising a program stored thereon, the program causing a computer to function as:

an image acquisition unit for acquiring:

a first image including, as a subject, a first region captured by a first camera which captures an image from a first altitude toward a direction of an altitude lower than the first altitude, and a second image including, as a subject, the first region captured by a second camera which captures an image from a second altitude toward a direction of an altitude lower than the second altitude;

a map data reference unit for referring to map data including information on topographies and buildings, and a flying object detection unit for detecting a flying object at an altitude lower than the first altitude and the second altitude, based on a difference between the first region in the first image and the first region in the second image, and information on topographies and buildings within a range corresponding to the first region in the map data.

17. A flight vehicle comprising:
the first camera;
the second camera; and
the image processing device according to claim 1.

18. A flight vehicle comprising:
the first camera;
the second camera; and
the image processing device according to claim 4.

* * * * *